United States Patent
Berends

(10) Patent No.: US 9,289,726 B2
(45) Date of Patent: Mar. 22, 2016

(54) METHOD FOR FORMING A MEMBRANE HOLDER AND MEMBRANE HOLDER THUS FORMED

(75) Inventor: Hendrik Johan Ferdinand Berends, Nijverdal (NL)

(73) Assignee: NX Filtration Holdings B.V., Oldenzaalses traat (NL)

( * ) Notice: Subject to any disclaimer, the term of this patent is extended or adjusted under 35 U.S.C. 154(b) by 1072 days.

(21) Appl. No.: 13/139,486

(22) PCT Filed: Nov. 4, 2009

(86) PCT No.: PCT/NL2009/050662
§ 371 (c)(1),
(2), (4) Date: Aug. 4, 2011

(87) PCT Pub. No.: WO2010/071419
PCT Pub. Date: Jun. 24, 2010

(65) Prior Publication Data
US 2012/0132580 A1    May 31, 2012

(30) Foreign Application Priority Data
Dec. 16, 2008  (NL) .................................... 1036319

(51) Int. Cl.
*B01D 63/02* (2006.01)
*B01D 63/04* (2006.01)
*B01D 65/00* (2006.01)

(52) U.S. Cl.
CPC .............. *B01D 63/021* (2013.01); *B01D 63/04* (2013.01); *B01D 65/00* (2013.01); *B01D 2313/20* (2013.01); *Y10T 29/49826* (2015.01); *Y10T 29/53* (2015.01)

(58) Field of Classification Search
None
See application file for complete search history.

(56) References Cited

U.S. PATENT DOCUMENTS

2006/0124531 A1* 6/2006 Behrendt et al. .......... 210/321.88
2007/0095741 A1* 5/2007 Berends ..................... 210/321.6

FOREIGN PATENT DOCUMENTS

| WO | 2004043578 | 5/2004 |
| WO | 2004101120 | 11/2004 |
| WO | 2007073080 | 6/2007 |
| WO | 2009057997 | 5/2009 |

OTHER PUBLICATIONS

International Search Report for PCT application No. PCT/NL2009/050662, dated Feb. 17, 2010.

* cited by examiner

*Primary Examiner* — Benjamin Kurtz
(74) *Attorney, Agent, or Firm* — Edward Baba; Bozicevic, Field & Francis LLP

(57) ABSTRACT

The invention relates to a method for forming a membrane holder for applying in a tube filter, by mutually connecting a number of cassettes of V-shaped cross-sectional form, wherein a plurality of cassettes are placed successively and connected to each other in longitudinal direction in a row. The V-shaped cross-section of each cassette can herein be defined by two walls and a bridge piece located therebetween, wherein each wall has a number of cut-away portions. The cassettes can be mutually connected such that a cut-away portion in a wall of the one cassette is bridged by a full wall part of the other cassette. The cassettes can be mutually connected close to the base of their V-shaped cross-section, for instance by being snapped together. The invention further relates to a membrane holder obtained by applying this method, to cassettes for use in the method and in the membrane holder, and to a tube filter in which such a membrane holder is applied.

22 Claims, 6 Drawing Sheets

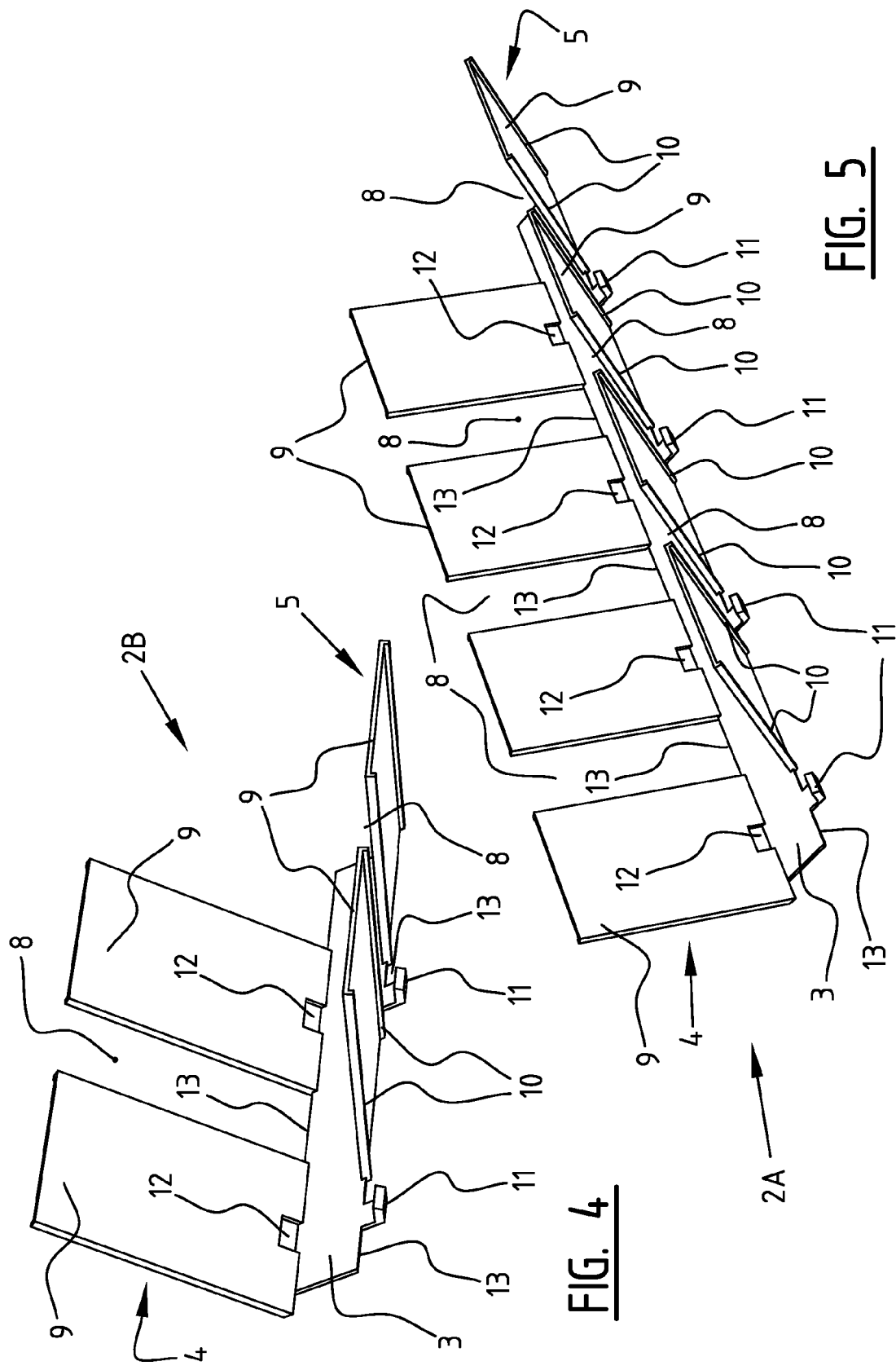

METHOD FOR FORMING A MEMBRANE HOLDER AND MEMBRANE HOLDER THUS FORMED

Figure 1:
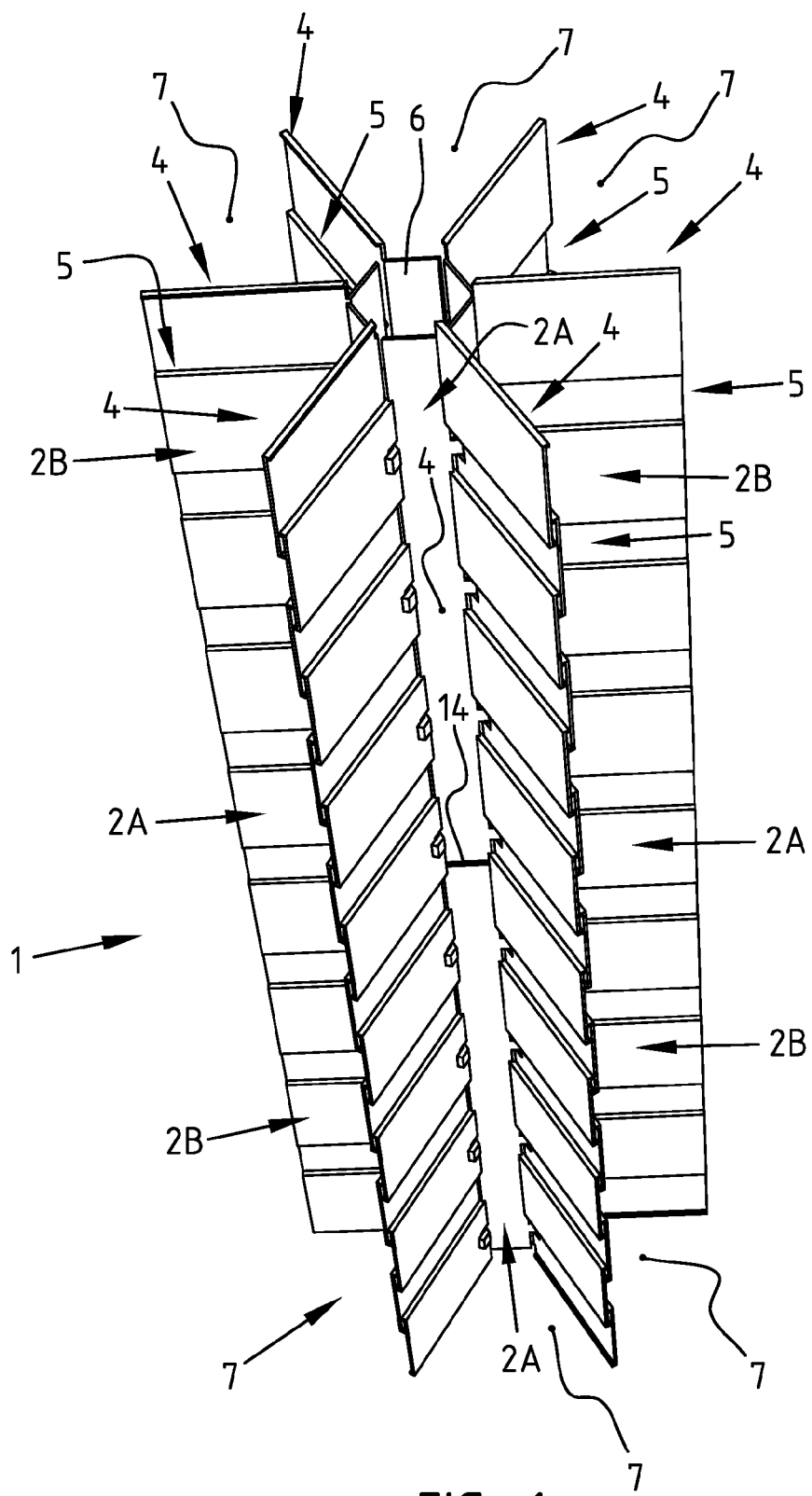

The invention relates to a method for forming a membrane holder, in particular for applying in a tube filter, by mutually connecting a number of cassettes of substantially V-shaped cross-sectional form.

A conventional forming method makes use of a central tube with a number of radial grooves running in longitudinal direction into which intermediate walls are inserted. Two of these walls, which protrude from the central tube like the spokes of a wheel, then form a compartment with a part of the tube periphery. In this compartment are laid a number of hollow fibre membranes which are enclosed by a number of brackets or straps tensioned over the free end edges of the two walls. When all compartments of the membrane holder have been filled with hollow fibre membranes, the membrane holder is pushed into an outer tube which functions as filter housing. Finally, the outer ends of the outer tube are sealed by pouring a synthetic resin therein.

This method is particularly labour-intensive and so expensive, and is therefore not suitable for the production of large series. In addition, the conventional construction of the tube filters requires a relatively large amount of material, thereby increasing costs still further. Now that the use of tube filters is very much on the increase, there is a need for a more efficient production technique and a construction which requires less material.

The non pre-published international patent application PCT/NL2008/000220 of applicant already describes a method for forming a membrane holder, wherein a number of substantially V-shaped, elongate cassettes are laid adjacently of each other and hingedly connected. The hinged connection can be formed here by linear hinges or by local welding. The cassettes are each filled with hollow fibre membranes and then closed by brackets or by a film, which can also form the hinged connections. Finally, the hinged cassettes are rolled up, wherein their side walls come to rest against each other and the truncated points of their V-shape together define an inner housing. The rolled-up cassettes can then be pushed into an outer housing.

Although this method represents a considerable improvement compared to the above described conventional method, it nevertheless has a number of drawbacks. As a result of the corrugated shape of the side walls the cassettes must thus be formed by injection moulding. Because tube filters usually have a length of a meter or more, this requires the use of large and complicated moulds and injection moulding machines, whereby the costs are considerable. This construction moreover also requires a large quantity of material, this further increasing costs.

The invention therefore has for its object to provide a method for forming a membrane holder, wherein the above discussed drawbacks do not occur, or at least do so to lesser extent. According to a first aspect of the invention, this is achieved with a method in which a plurality of cassettes are placed successively and connected to each other in longitudinal direction in a row. Successive placing of a plurality of cassettes makes it possible for the individual cassettes to be shorter than the tube filter in which the membrane holder is applied. These relatively short cassettes can be manufactured in a compact mould and a small injection moulding machine.

A plurality of cassettes are preferably placed adjacently of each other and mutually connected in transverse direction, thus forming different adjacent rows of cassettes, wherein transitions between cassettes in a row are offset relative to transitions between cassettes in an adjacent row. A robust membrane holder is formed by assembling the cassettes in the manner of brickwork bond.

In order to obtain a membrane holder of uniform dimensions it is recommended that cassettes of different lengths are mutually connected such that rows of cassettes having in each case substantially the same overall length are formed.

According to a second aspect, the invention provides a method of the above described type, wherein the substantially V-shaped cross-section of each cassette is defined by two walls and a bridge piece located therebetween, wherein each wall has a number of cut-away portions, and the cassettes are mutually connected such that a cut-away portion in a wall of the one cassette is bridged by a full wall part of the other cassette. Closed walls can thus be formed between two adjacent cassettes with a minimal use of material.

When each wall of a cassette has alternately a cut-away portion and a full wall part, wherein a cut-away portion in the one wall is situated opposite a full wall part of the other wall, and the cassettes are mutually connected such that the cut-away portions and full wall parts in corresponding walls of adjacent cassettes always lie mutually in line in transverse direction, a wholly uniform construction of the walls between adjacent cassettes is achieved. Liquid flowing through the hollow fibre membranes can thus flow away through the centre of the tube filter in similar manner at any point of the tube filter.

According to a third aspect, the invention provides a method wherein the cassettes are mutually connected close to the base of their substantially V-shaped cross-section. Such a connection is strong and stable and makes it possible to move the cassettes in simple manner to the desired end form. The cassettes are preferably snapped together. A snap connection can be effected quickly and easily and, if desired, can also be released again.

The invention further relates to a membrane holder, in particular for applying in a tube filter, which comprises a number of mutually connected cassettes of substantially V-shaped cross-sectional form. Such a membrane holder is likewise described in above stated patent application PCT/NL2008/000220 of applicant.

The invention has for its object to provide an improved membrane holder of this type. According to a first aspect of the invention, this is achieved with a membrane holder provided with a plurality of mutually connected cassettes placed successively in a row in longitudinal direction. Preferred embodiments of this membrane holder are set forth in the claims.

According to a second aspect, the invention provides a membrane holder wherein each cassette of substantially V-shaped cross-section comprises two walls and a bridge piece located therebetween, wherein each wall has a number of cut-away portions and the cassettes are mutually connected such that a cut-away portion in a wall of the one cassette is bridged by a full wall part of the other cassette. A preferably applied embodiment of this membrane holder is set forth in the claims. Each full wall part otherwise advantageously has bent end edges, whereby radial ducts are formed between the adjacent cassettes.

According to yet another aspect of the invention, the cassettes are mutually connected close to the base of their substantially V-shaped cross-section. The cassettes can advantageously be snapped together here. Each cassette preferably has a number of hooking arms protruding in each case from the bridge piece at the position of a cut-away portion and a corresponding number of recesses formed in each case in a full wall part. The snap connections can thus be formed without this causing loss of space inside the cassettes which is intended for receiving the hollow fibre membranes.

Finally, the invention also relates to cassettes of substantially V-shaped cross-sectional form intended for applying in the above described method and/or membrane holder, and a tube filter in which such a membrane holder is applied.

Figure 2:
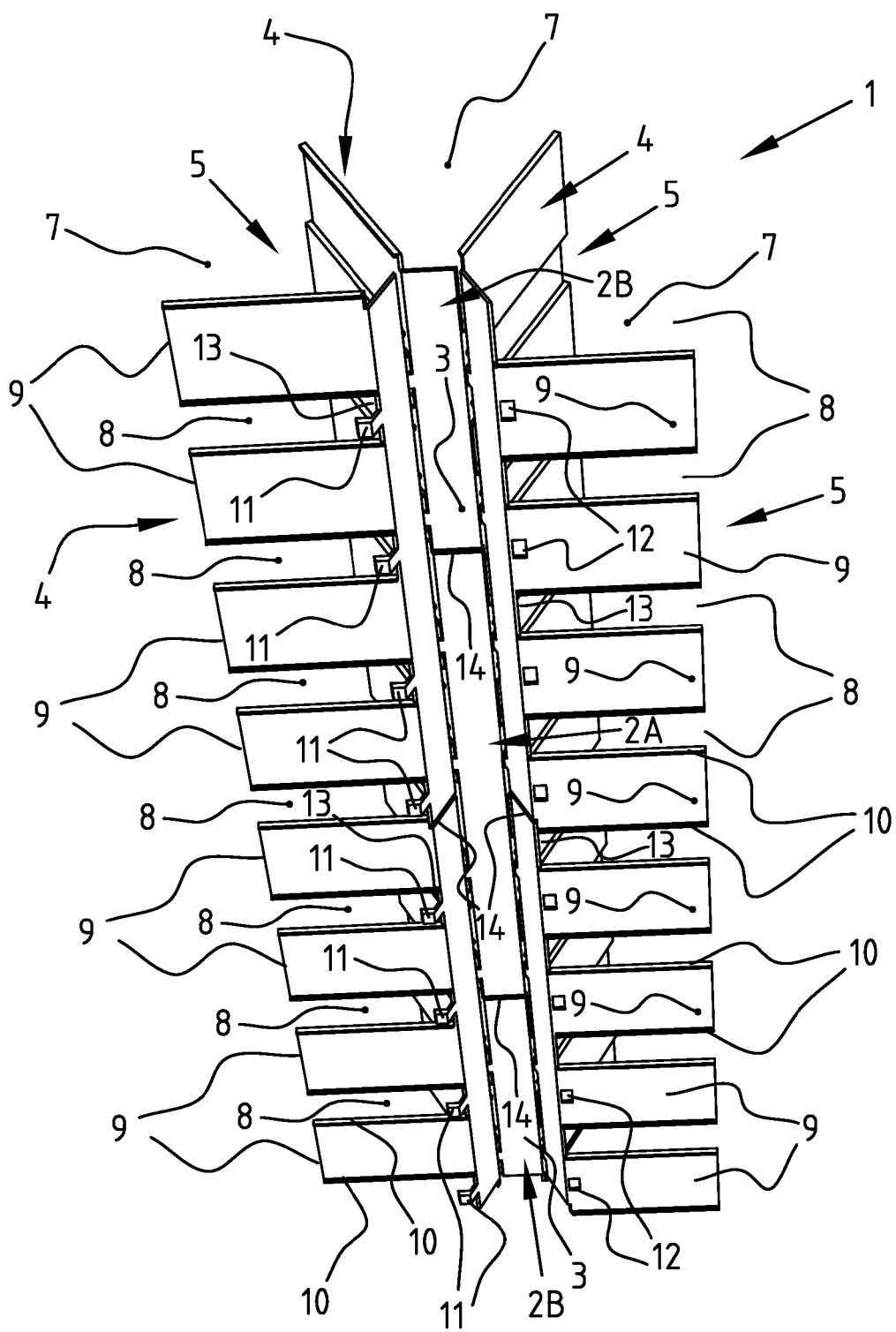
Figure 3:
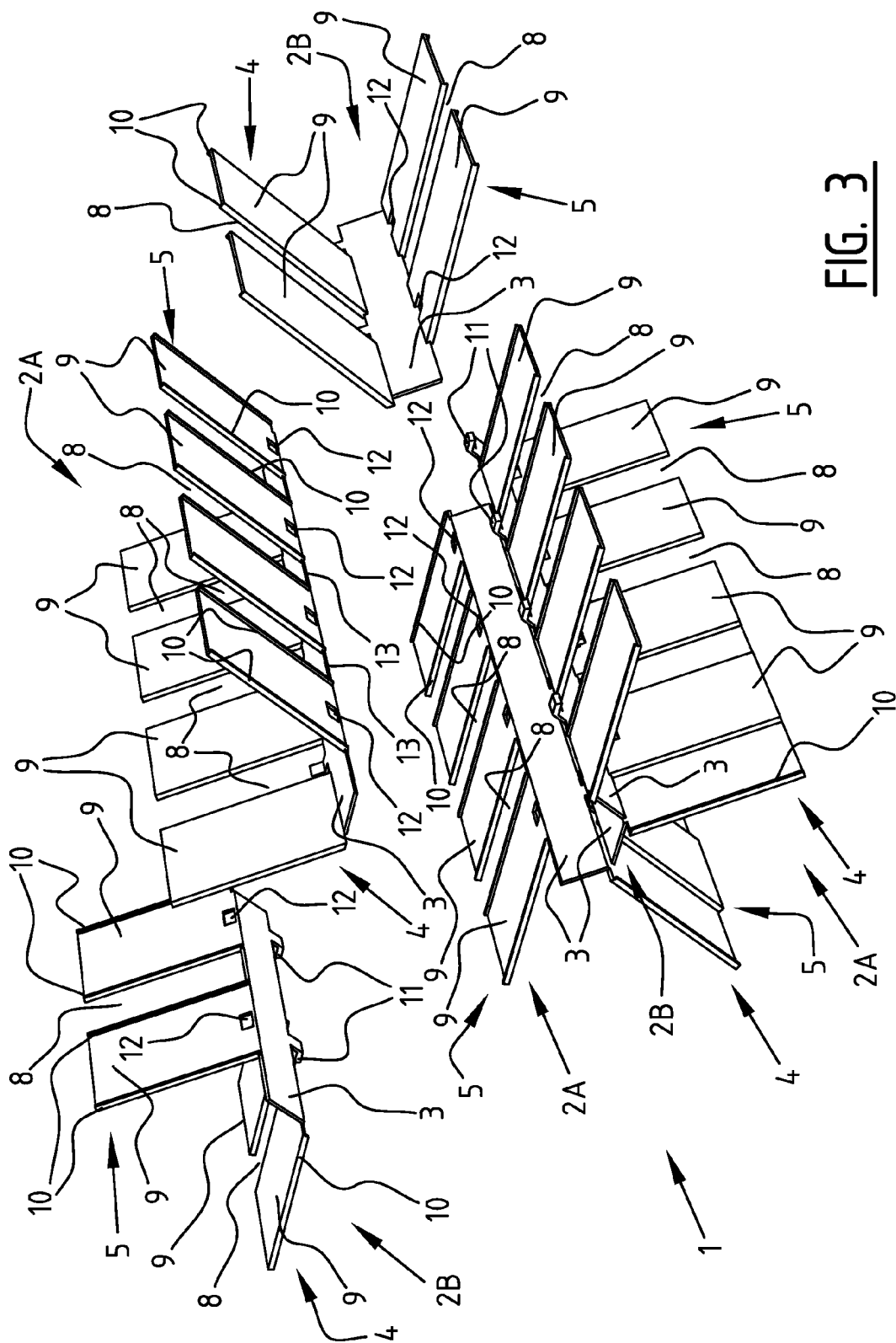
Figure 6:
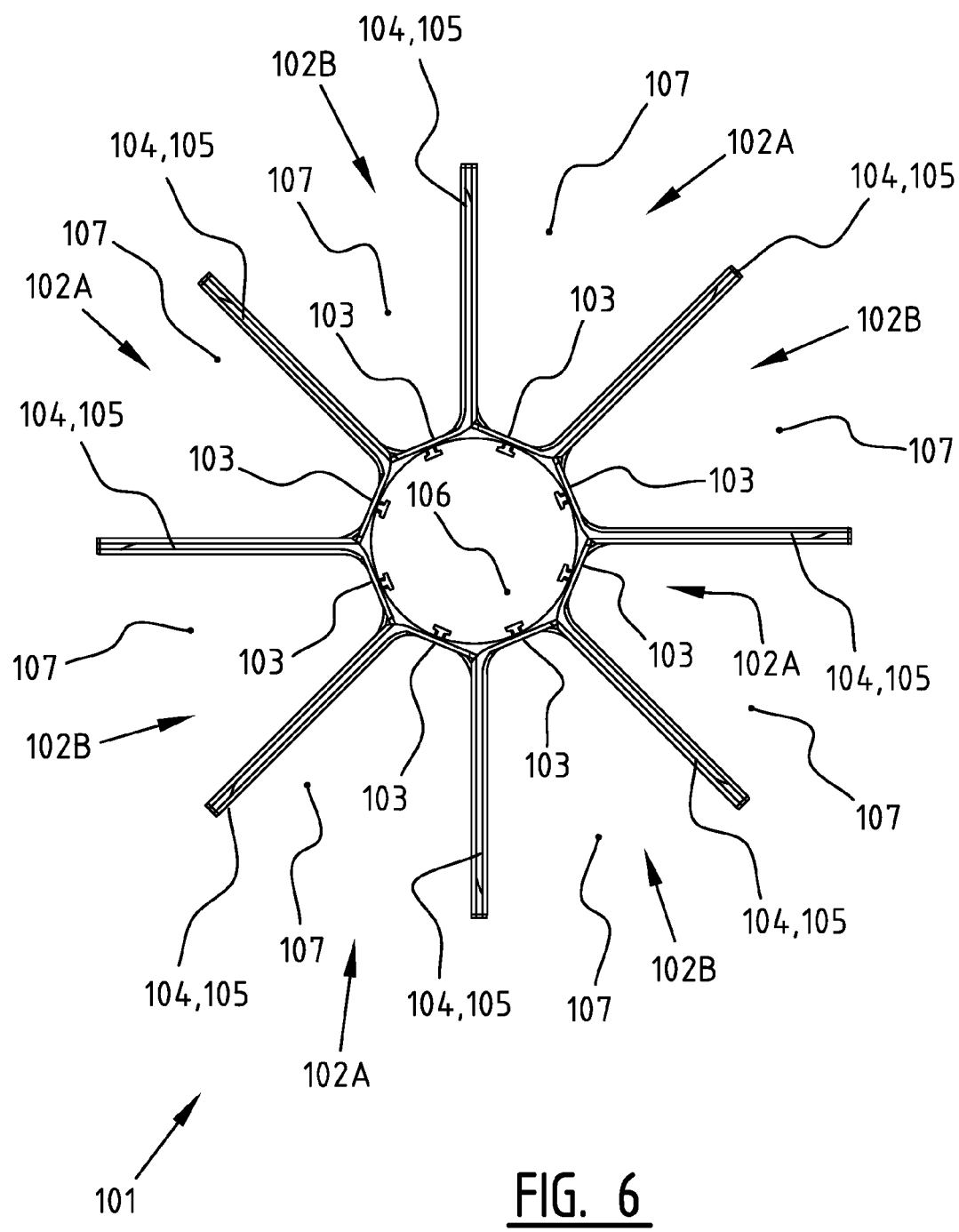
Figure 7:
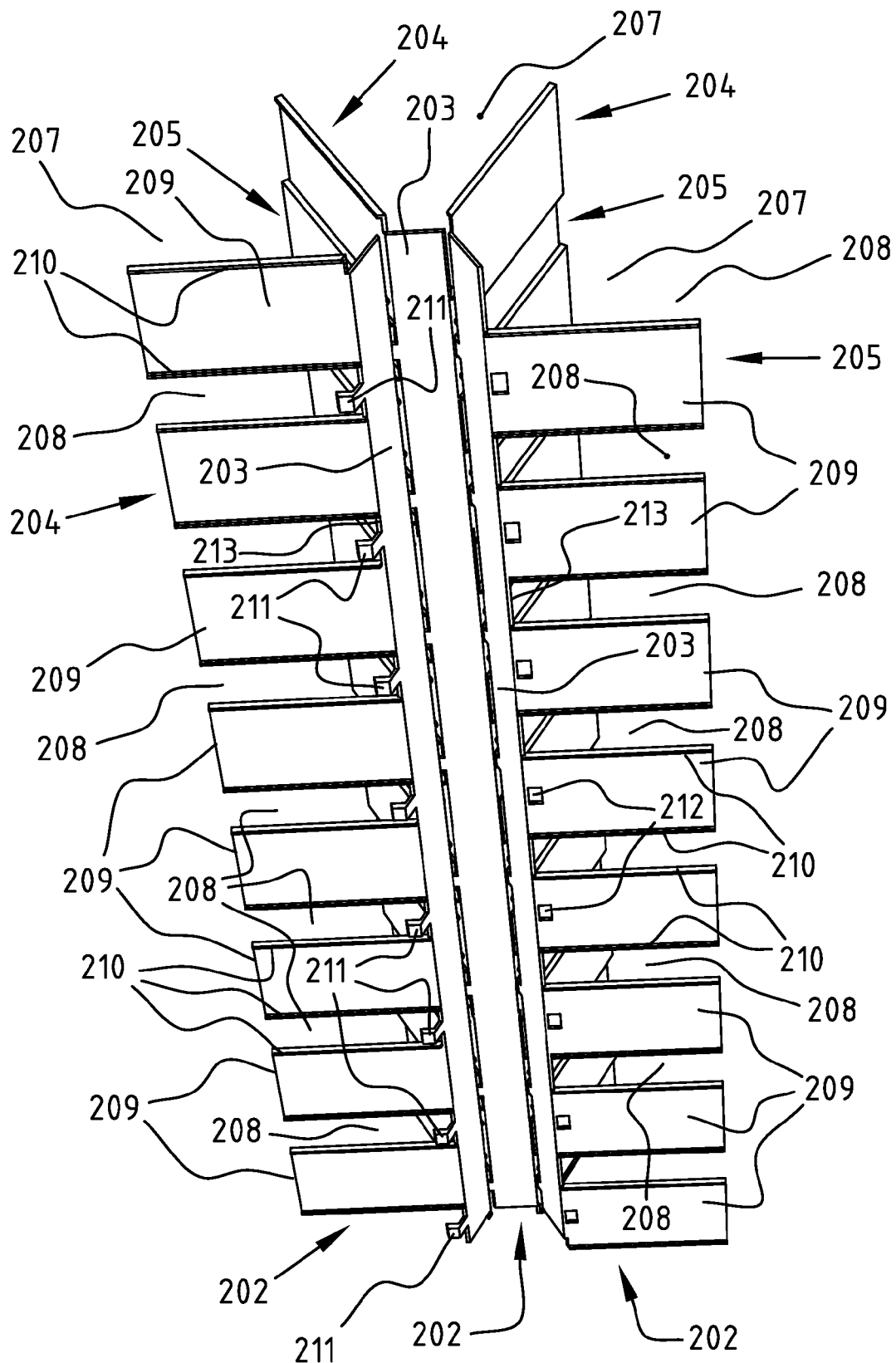

The invention will now be elucidated on the basis of two embodiments, wherein reference is made to the accompanying drawing, in which corresponding components are designated with reference numerals increased in each case by "100", and in which:

FIG. 1 is a perspective view of a membrane holder according to a first embodiment of the invention, which is constructed from a number of cassettes mutually connected in longitudinal direction and in transverse direction, FIG. 2 is a perspective view of a half of the membrane holder of FIG. 1, FIG. 3 shows a perspective view with exploded parts of a part of the membrane holder of FIGS. 1 and 2, FIGS. 4 and 5 are perspective views of respectively a short and a long cassette for applying in the membrane holder of FIG. 1-3, FIG. 6 is an end view of a membrane holder according to a second embodiment of the invention with eight compartments, and FIG. 7 is a view corresponding to FIG. 2 of a third embodiment of the invention, wherein the cassettes extend along the whole length of the membrane holder.

A membrane holder 1 according to a first embodiment of the invention is constructed from a number of first and second cassettes 2A, 2B connected to each other in longitudinal direction and in transverse direction and having a substantially V-shaped cross-sectional form. The first cassettes 2A are here relatively long, while second cassettes 2B are relatively short, in the shown example half the length of first cassettes 2A (FIG. 2). The first and second cassettes 2A, 2B are otherwise of identical construction (FIG. 4, 5).

Each cassette 2A, 2B which has a bridge piece 3 and two walls 4, 5 which enclose an acute angle. In the shown example this angle amounts to 60 degrees so that a whole arc of a circle is covered by mutually connecting six cassettes 2A, 2B (FIG. 1). Due to the presence of bridge piece 3 the V-shape of cassettes 2A, 2B is truncated, whereby cassettes 2A, 2B define a central duct 6 in the assembled state. The space bounded by each set of walls 4, 5 and bridge piece 3 forms a compartment 7 in which a bundle of hollow fibre membranes (not shown here) can be received. This compartment 7 can be closed on its open side by a series of brackets or straps (not shown) which are arranged at intervals over the two walls 4, 5 or by a film (likewise not shown here) extending over the full length of compartment 7.

In the shown embodiment each compartment 7 extends over a row of cassettes 2A, 2B. These cassettes 2A, 2B are mutually connected such that the transitions 14 between cassettes 2A, 2B in the one row are offset relative to transitions 14 between cassettes 2A, 2B in an adjacent row (FIG. 2). A bond is in this way created between cassettes 2A, 2B which is comparable to the bond in brickwork. In order to ensure that each row of cassettes 2A, 2B nevertheless has the same length, in the shown embodiment two first cassettes 2A in a row are mutually connected and a first cassette 2A and two second cassettes 2B in a subsequent row are mutually connected (FIG. 3) in alternating manner.

In order to limit use of material each wall of a cassette 2A, 2B has alternately a cut-away portion 8 and a full wall part 9. Cassettes 2A, 2B are further connected to each other such that a cut-away portion 8 in a wall of the one cassette 2A, 2B is bridged by a full wall part 9 of the adjacent cassette 2B, 2A. Substantially half of the material necessary to form a continuous wall between two adjacent compartments 7 is thus saved. In the shown example cassettes 2A, 2B are formed such that a cut-away portion 8 in the one wall 4, 5 is situated opposite a full wall part 9 of the other wall 5, 4. Cassettes 2A, 2B are moreover connected to each other such that cut-away portions 8 and full wall parts 9 in corresponding walls 4, 5 of adjacent cassettes 2A, 2B always lie mutually in line in transverse direction.

Full wall parts 9 further have bent end edges 10 so that stepped walls are defined in each case between adjacent cassettes 2A, 2B in the assembled situation. Cut-away portions 8 are thus kept free of hollow fibre membranes by these stepped walls so that these cut-away portions 8 define radial channels through which liquid can flow from the hollow fibre membranes to central duct 6. For this purpose cut-away portions 8 take an open form on their lower edge 13.

Cassettes 2A, 2B are mutually connected close to the base of their substantially V-shaped cross-section, i.e. at the position of their bridge pieces 3. In the shown example cassettes 2A, 2B are snapped together. For this purpose each cassette 2A, 2B here has a number of hooking arms 11, which protrude in each case from bridge piece 3 at the position of a cut-away portion 8. Each cassette 2A, 2B also has a corresponding number of recesses 12 which are formed in each case in a full wall part 9. Two cassettes 2A, 2B can be connected to each other quickly and easily by placing hooking arms 11 into recesses 12. In the shown example the embodiment of hooking arms 11 and recesses 12 is herein such that cassettes 2A, 2B are still slightly pivotable relative to each other. Cassettes 2A, 2B can thus be placed in a suitable position in simple manner for connection thereof to a subsequent cassette 2A, 2B.

Once all cassettes 2A, 2B have been mutually connected and membrane holder 1 has been formed, all compartments 7 defined by cassettes 2A, 2B can be filled with hollow fibre membranes, after which compartments 7 can be covered in order to enclose the hollow fibre membranes therein. The thus filled membrane holder can then be pushed into an outer housing, after which the ends of the tube are sealed in conventional manner with a synthetic resin.

The number of compartments formed in the membrane holder can in principle be freely chosen. A membrane holder 101 having eight compartments 107 can thus be formed by limiting the angle enclosed between walls 104, 105 of each cassette 102A, 102B to 45 degrees (FIG. 6). The construction of cassettes 102A, 102B, the manner in which they are connected to each other and the filling thereof with hollow fibre membranes can in this case be identical to the first exemplary embodiment.

The number of cassettes which are connected to each other to form the membrane holder can also be freely chosen. Although it is recommended at the moment in respect of production costs of the cassettes to place a plurality of relatively short cassettes successively in a row, it could be advantageous for larger series to make use of cassettes which extend over the whole length of the tube filter. Although this would increase the production costs per cassette, it would reduce assembly costs.

FIG. 7 shows an example of a membrane holder 201 constructed from cassettes 202 which are each about the same length as the tube filter in which membrane holder 201 will be applied. There are therefore no transitions in longitudinal direction in this embodiment. The construction of these cassettes 202 is otherwise wholly the same as that of cassettes 2A, 2B of the first embodiment.

The invention makes it possible in the above described manner to form a membrane holder in simple and rapid manner and with minimal use of material.

Although the invention has been elucidated above on the basis of a number of embodiments, it will be apparent that it is not limited thereto. The chosen embodiment of the individual cassettes and the method of connecting adjacent cassettes in longitudinal and transverse direction could thus be other than shown here. More or fewer cassettes could also be connected to each other than in the shown examples. All new aspects of the invention can further be applied individually of each other in otherwise conventional methods or in combination with otherwise conventional membrane holders while retaining the associated advantages. The scope of the invention is therefore defined solely by the following claims.

The invention claimed is:

1. A method for forming a membrane holder, in particular for applying in a tube filter, by mutually connecting a number of cassettes of substantially V-shaped cross-sectional form, each of said cassettes having a first end and a second end, wherein a plurality of cassettes are placed successively and connected to each other end-to-end in longitudinal direction in a row, a first end of one of the cassettes in the row being connected to a second end of a next cassette in the row, the cassettes when connected extending over the entire length of the membrane holder.

2. The method as claimed in claim 1, wherein a plurality of cassettes are placed adjacently of each other and mutually connected in transverse direction, thus forming different adjacent rows of cassettes, wherein transitions between cassettes in a row are offset relative to transitions between cassettes in an adjacent row.

3. The method as claimed in claim 2, wherein cassettes of different lengths are mutually connected such that rows of cassettes having in each case substantially the same overall length are formed.

4. The method as claimed in claim 1, wherein the substantially V-shaped cross-section of each cassette is defined by two walls and a bridge piece located therebetween, wherein each wall has a number of cut-away portions, and the cassettes are mutually connected such that a cut-away portion in a wall of the one cassette is bridged by a full wall part of the other cassette so as to form a closed wall between the cassettes.

5. The method as claimed in claim 4, wherein each wall of a cassette has alternately a cut-away portion and a full wall part, wherein a cut-away portion in the one wall is situated opposite a full wall part of the other wall, and the cassettes are mutually connected such that the cut-away portions and full wall parts in corresponding walls of adjacent cassettes always lie mutually in line in transverse direction.

6. The method as claimed in claim 1, wherein the cassettes are mutually connected close to the base of their substantially V-shaped cross-section.

7. The method as claimed in claim 6, wherein the cassettes are snapped together.

8. A membrane holder, in particular for applying in a tube filter, comprising a number of mutually connected cassettes of substantially V-shaped cross-sectional form, each of said cassettes having a first end and a second end, further comprising a plurality of mutually connected cassettes placed successively end-to-end in a row in longitudinal direction, a first end of one of the cassettes in the row being connected to a second end of a next cassette in the row, and the mutually connected cassettes extending over the entire length of the membrane holder.

9. The membrane holder as claimed in claim 8, wherein a plurality of cassettes are placed adjacently of each other and mutually connected in transverse direction, thus forming different adjacent rows of cassettes, wherein transitions between cassettes in a row are offset relative to transitions between cassettes in an adjacent row.

10. The membrane holder as claimed in claim 9, wherein the mutually connected cassettes have different lengths such that each row of cassettes has substantially the same overall length.

11. The membrane holder as claimed in claim 8, wherein each cassette of substantially V-shaped cross-section comprises two walls and a bridge piece located therebetween, wherein each wall has a number of cut-away portions and the cassettes are mutually connected such that a cut-away portion in a wall of the one cassette is bridged by a full wall part of the other cassette so as to form a closed wall between the cassettes.

12. The membrane holder as claimed in claim 11, wherein each wall of a cassette has alternately a cut-away portion and a full wall part, wherein a cut-away portion in the one wall is situated opposite a full wall part of the other wall, and the cassettes are mutually connected such that the cut-away portions and full wall parts in corresponding walls of adjacent cassettes always lie mutually in line in transverse direction.

13. The membrane holder as claimed in claim 11, wherein each full wall part has bent end edges.

14. The membrane holder as claimed in claim 8, wherein the cassettes are mutually connected close to the base of their substantially V-shaped cross-section.

15. The membrane holder as claimed in claim 14, wherein the cassettes are snapped together.

16. The membrane holder as claimed in claims 12, wherein each cassette has a number of hooking arms protruding in each case from the bridge piece at the position of a cut-away portion, and a corresponding number of recesses formed in each case in a full wall part.

17. A tube filter, comprising:
a tube having therein a membrane holder, said membrane holder comprising a number of mutually connected cassettes of substantially V-shaped cross-sectional form, each of said cassettes having a first end and a second end, said membrane holder further comprising a plurality of mutually connected cassettes placed successively in a row in longitudinal direction, a first end of one of the cassettes in the row being connected to a second end of a next cassette in the row, and
a number of hollow fibre membranes arranged distributed over the different cassettes in the membrane holder.

18. A method for forming a membrane holder, in particular for applying in a tube filter, by mutually connecting a number of cassettes of substantially V-shaped cross-sectional form, wherein a plurality of cassettes are placed successively and connected to each other in longitudinal direction in a row, and
wherein a plurality of cassettes are placed adjacently of each other and mutually connected in transverse direction, thus forming different adjacent rows of cassettes, wherein transitions between cassettes in a row are offset relative to transitions between cassettes in an adjacent row.

19. A method for forming a membrane holder, in particular for applying in a tube filter, by mutually connecting a number of cassettes of substantially V-shaped cross-sectional form, each of said cassettes having a first end and a second end, wherein a plurality of cassettes are placed successively and connected to each other in longitudinal direction in a row, a first end of one of the cassettes in the row being connected to a second end of a next cassette in the row, and wherein the substantially V-shaped cross-section of each cassette is defined by two walls and a bridge piece located therebetween, wherein each wall has a number of cut-away portions, and the cassettes are mutually connected such that a cut-away portion in a wall of the one cassette is bridged by a full wall part of the other cassette so as to form a closed wall between the cassettes.

20. A membrane holder, in particular for applying in a tube filter, comprising a number of mutually connected cassettes of substantially V-shaped cross-sectional form, characterized by a plurality of mutually connected cassettes placed successively in a row in longitudinal direction, wherein a plurality of cassettes are placed adjacently of each other and mutually connected in transverse direction, thus forming different adjacent rows of cassettes, wherein transitions between cassettes in a row are offset relative to transitions between cassettes in an adjacent row.

21. A membrane holder, in particular for applying in a tube filter, comprising a number of mutually connected cassettes of substantially V-shaped cross-sectional form, each of said cassettes having a first end and a second end, further comprising a plurality of mutually connected cassettes placed successively in a row in longitudinal direction, a first end of one of the cassettes in the row being connected to a second end of a next cassette in the row, wherein each cassette of substantially V-shaped cross-section comprises two walls and a bridge piece located therebetween, wherein each wall has a number of cut-away portions and the cassettes are mutually connected such that a cut-away portion in a wall of the one cassette is bridged by a full wall part of the other cassette so as to form a closed wall between the cassettes.

22. A membrane holder, in particular for applying in a tube filter, comprising a number of mutually connected cassettes of substantially V-shaped cross-sectional form, characterized by a plurality of mutually connected cassettes placed successively in a row in longitudinal direction, wherein each cassette of substantially V-shaped cross-section comprises two walls and a bridge piece located therebetween, wherein each wall has a number of cut-away portions and the cassettes are mutually connected such that a cut-away portion in a wall of the one cassette is bridged by a full wall part of the other cassette, wherein each wall of a cassette has alternately a cut-away portion and a full wall part, wherein a cut-away portion in the one wall is situated opposite a full wall part of the other wall, and the cassettes are mutually connected such that the cut-away portions and full wall parts in corresponding walls of adjacent cassettes always lie mutually in line in transverse direction, and wherein each cassette has a number of hooking arms protruding in each case from the bridge piece at the position of a cut-away portion, and a corresponding number of recesses formed in each case in a full wall part.

* * * * *